United States Patent
Garber et al.

(10) Patent No.: US 6,347,323 B1
(45) Date of Patent: Feb. 12, 2002

(54) ROBUST MODIFICATION OF PERSISTENT OBJECTS WHILE PRESERVING FORMATTING AND OTHER ATTRIBUTES

(75) Inventors: David G. Garber, Bellevue; Theodore J. Stefanik, Redmond; Terrence R. Crowley, Woodinville; Michael A. Angiulo, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/282,027

(22) Filed: Mar. 26, 1999

(51) Int. Cl.[7] .......................... G06F 12/00; G06F 17/30
(52) U.S. Cl. ...................................... 707/203; 707/103
(58) Field of Search ........................... 707/203, 8, 100, 707/101, 102

(56) References Cited

U.S. PATENT DOCUMENTS

| | | | | |
|---|---|---|---|---|
| 4,558,416 A | * | 12/1985 | Schmidt et al. ............ | 707/203 |
| 5,119,476 A | * | 6/1992 | Texier ........................ | 395/157 |
| 5,737,608 A | * | 4/1998 | Van De Vanter ............ | 395/701 |
| 5,740,405 A | * | 4/1998 | DeGraaf ..................... | 707/203 |
| 5,881,292 A | * | 3/1999 | Sigal et al. ................. | 395/712 |
| 5,956,732 A | * | 9/1999 | Tsuchida ................... | 707/203 |
| 5,960,444 A | * | 9/1999 | Jackson ..................... | 707/203 |
| 5,983,242 A | * | 11/1999 | Brown et al. ............... | 707/203 |
| 6,026,417 A | * | 2/2000 | Ross et al. .................. | 707/517 |
| 6,182,286 B1 | * | 1/2001 | Sigal et al. ................. | 717/11 |
| 6,205,579 B1 | * | 3/2001 | Southgate ................... | 717/11 |
| 6,216,175 B1 | * | 4/2001 | Sliger et al. ................. | 710/1 |
| 6,226,658 B1 | * | 5/2001 | Smith ......................... | 707/517 |

* cited by examiner

Primary Examiner—Frantz Coby
(74) Attorney, Agent, or Firm—Ronald M. Anderson (57) ABSTRACT

A method and system for preserving attributes of objects within a file that was created in a different environment from that in which the file is opened, enabling the attributes to be maintained after the file is saved. For example, an HTML document created with a text editor includes elements such as plain text and HTML tags, with which attributes such as whitespace, line breaks, and indent level are associated. When such a document is opened in an HTML editor implementing the present invention, the attributes of these elements are preserved. Even when changes to these elements occur, to the extent possible, the method provides for determining attributes of related elements that were in the document as originally opened in the HTML editor, so that these attributes can be applied to corresponding objects that are added to the document or in regard to changes that are made by the user. The preservation of persistent object attributes is also applicable to other types of software applications such as language development systems and word processing programs. This invention thus insures, for example, that functions developed in newer versions of a program, although not recognized in an earlier version, persist when a file is opened in the earlier version and then saved.

27 Claims, 8 Drawing Sheets

ROBUST MODIFICATION OF PERSISTENT OBJECTS WHILE PRESERVING FORMATTING AND OTHER ATTRIBUTES

FIELD OF THE INVENTION

The present invention is generally related to the preservation of attributes of persistent objects when modifications are made thereto, and more specifically, to preserving attributes of the objects when a file including the objects is opened within an environment different than that in which the file was originally created.

BACKGROUND OF THE INVENTION

As a general rule, new versions of software add functions and attributes to objects in the software that were not found in previous versions. Because of differences between successive versions of a program related to implementing new functionality, problems can arise when a document or file created under a newer version of a software program is subsequently opened, executed, and/or revised, and then saved by an older version of the software. For example, Microsoft Corporation's WORD™ version 7 word processing program includes a feature in which Internet (or intranet) links are automatically recognized so that the corresponding site/page is readily accessed in a browser program that is activated when the link is selected (i.e., by double clicking a mouse or other pointing device while the cursor controlled by the device is over the link). To clearly differentiate such links from normal text, they are typically displayed using a blue font. Any document that includes such a link, when opened in an earlier version of the WORD™ word processing program, will also display the link in the blue font, but the older version of WORD™ will not provide the underlying hypertext link to the site referenced by the link and is not able to automatically cause a browser to open up the page referenced by the link. Moreover, if the document that originally included the link was created in version 7 of WORD™ is opened and saved in an earlier version of the word processing program, a hypertext link will no longer be associated with blue font text that references the site if the saved document is subsequently opened in version 7 of the word processing program. In other words, since the older version of the word processing program is not equipped to recognize the hypertext association originally included in the document, the software does not preserve the hypertext association in the document when saving it. The new or added functionality associated with objects in the document is thus lost as a result of the document being opened and saved by the earlier version of the word processing program.

A related problem arises when a hypertext markup language (HTML) document created in a conventional text editor is subsequently imported into, for example, Microsoft Corporation's FrontPage™ software application, which includes an HTML editor. This HTML editor is of the "what you see is what you get" (WYSIWYG) type, which greatly facilitates developing the desired look and feel of a web page, compared to simple text editors. (Note—the discussion of HTML documents that follows herein and in the claims is intended to encompass extended markup language (XML) documents as well.) Earlier versions of FrontPage™ have not made any attempt to preserve the stylistic formatting of an HTML document applied by the user in a text editor, when the document was opened within the HTML editor and then saved, but have simply applied a generally predefined style that is hard coded into the HTML editor, when saving any HTML document. Thus, the original formatting layout, indent levels, whitespace, and other stylistic attributes of objects provided by a user to a document when it was originally created and saved with a text editor, were lost by opening the document to make any change within the FrontPage™ HTML editor environment. Simply saving the document after it was opened in the FrontPage™ editor caused these stylistic and layout attributes to be lost.

One of the reasons that the formatting style of an HTML document has not previously been preserved under these circumstances is that an HTML editor usually transforms such a document into a substantially different representation internally, because the internal representation more effectively models how a web browser will display a web page defined by an HTML document. Particularly after changes to an imported HTML document have been made in an HTML editor, it becomes substantially more difficult to regenerate format and style (whitespace) of the original HTML document. However, people who create HTML documents often have strong opinions about retaining the style that they have applied to these documents. Users often believe that their style lends an HTML document readability; further, they may desire to retain a consistent look to all of the HTML documents that they create, based on their preferences. It is not surprising that many users of prior art HTML editing programs such as earlier versions of FrontPage™ have been unhappy about the loss of their preferred formatting style and layout in an HTML document when the document was opened in the HTML editor and then saved.

Of even greater concern than possible loss of a preferred formatting is that changes made by previous versions of FrontPage™ to the whitespace and layout of an HTML document imported into the HTML editor can actually break the functionality of scripts and cascading style sheets on a page. The result is that simply by opening and re-saving the page (or by editing it in the "wysiwyg" view of the program), the page is so changed that scripts may not function and the formatting and layout of tables is possibly changed.

Ideally, an HTML document created in one environment that is imported into another environment, such as an HTML editor, should preserve the document's original formatting, including both the text and layout style (whitespace) around objects, as much as possible. Importing an HTML document into an editor should not cause any loss of functionality or loss of formatting in tables. Furthermore, the HTML editor should determine the formatting style employed in an imported HTML document created in a different environment so that the style may be applied to changes made to the document within the HTML editor and to newly added objects. Clearly, if a user has simply opened an HTML document within the HTML editor and saved it without making any changes, additions, or deletions, the exact formatting style and text of the original document should be retained. It would also be desirable to enable the user to compare the original version of the HTML document with the version that is saved, after changes, deletions, or additions have been made by the HTML editor. This comparison might be made using any of various types of document comparison tools available from other sources, so that the user can see the changes made as a result of editing the HTML document.

The prior art does not provide a fully satisfactory solution to these problems. Macromedia's DREAMWEAVER™ software includes an HTML editor that preserves much of the whitespace in an imported HTML document that has been opened and then saved. However, once a structure or region in an imported HTML document is edited in the DREAMWEAVER HTML editor, the whitespace is reformatted to conform to an internally predetermined style that is part of the software program. Furthermore, if text is added to an imported HTML document open in the DREAMWEAVER™ HTML editor, the indent level of the existing surrounding text is not applied to the newly added text. When a copy/paste occurs in an open document, i.e., when formatted text is copied and then pasted into a different part of an HTML document, all surrounding whitespace related to the copied text is lost in the region in which the text is pasted. In addition, this HTML editor does not appear to support the preservation of misnested tags. Tags are misnested if the order in which they are opened is not the same as the (reverse) order in which they are closed. For example, the tag <b><u>hello</b></u> is misnested—it should be <b><u>hello</u></b>. For some tags, the effect of misnesting a tag is innocuous (however, it depends upon on the browser in which the HTML document with a misnested tag is opened). In other cases, the effect is much more serious because the misnesting causes a significant unintended result. For example, in the tag: <table><tr><td>inside</tr>outside</td></table>, the </td> end tag is invalid, because it is outside of the <tr> tag in which the <td> was opened.

Another prior art editor, which is used for more general program development applicable to a multi-tier architecture, appears in Microsoft Corporation's VISUAL INTERDEV™, version 6.0 software. This editor attempts to preserve certain attributes of specific objects in an imported text file. Whitespace in a text file that is opened in the editor and saved without changes is preserved; but, if changes are made in the file, tags may be modified, attribute value case is not preserved, attribute ordering is not preserved, and whitespace is not preserved. In addition, whitespace surrounding plain text is not preserved. Entities that may appear in the text, e.g., representation of printable characters in a form such as "a", are generated when needed, but only in one preferred form, not necessarily in the form employed by the user in an imported file created in a different environment. It would be preferable to preserve the form used in an imported text file and to employ the same type or form for representing any new entities added to a document or file.

As will be apparent from the initial discussion relating to the problems that arise due to differences in attributes employed in different versions of a word processing program, these problems are not limited to imported HTML documents opened in an HTML editor. More generally, these problems can arise when files that include objects having associated attributes in one system are opened in another system or software environment. For example, in a programming environment, the class of an object should persist, even though class descriptions change in a different environment/version of the programming language. This point is illustrated by the following. Assume that a software system includes an object named "CEmployee." This object has the following class definition:

```
class CEmployee
{
    CString FirstName;
    CString LastName;
    CString SocialSecurityNumber;
    CString Department;
}
```

After the software system enables input data on employees to be printed, it is usually desirable to enable the data to be saved for future use. When making the CEmployee object persistent, most software systems use an algorithm like:

```
CEmployee::Store
{
    Output.write(FirstName);
    Output.write(LastName);
    Output.write(SocialSecurityNumber);
    Output.write(Department);
}
```
or:
```
CEmployee::Store
{
    Output.write("FirstName");
    Output.write(FirstName);
    Output.write("LastName");
    Output.write(LastName);
    Output.write("SSN");
    Output.write(SocialSecurityNumber);
    Output.write("Department");
    Output.write(Department);
}
```

The software will invoke these output routines repeatedly, once for each employee object to be stored, resulting in an output stream that looks like:

```
John*Doe*123456789*FrontPage+Jane*Smith*234567890*
FrontPage
```
or:
```
FirstName*John*LastName*Doe*SSN*123456789*Department
*
FrontPage+FirstName*Jane*LastName*Smith*SSN*23456789
0*
Department*FrontPage
``` where * represents a marker the software recognizes as separating the data values and + represents a marker the software recognizes as separating each object.

The software reads the code with an algorithm such as:

```
CEmployee::Read
{
    Input.read(FirstName);
    Input.read(LastName);
    Input.read(SocialSecurityNumber);
    Input.read(Department);
}
```
or
```
CEmployee::Read
{
    CString attributeName;
    while (Input.read(attributeName))
    {
        if (attributeName == "FirstName")
            Input.read(FirstName);
        else if (attributeName == "LastName")
            Input.read(LastName);
        else if (attributeName == "SSN")
    Input.read(SocialSecurityNumber);
        else if (attributeName == "Department")
            Input.read(Department);
    }
}
```

However, a later version of the software may extend the CEmployee class by adding the attribute "Manager":

```
class CEmployee
{
    CString FirstName;
    CString LastName;
    CString SocialSecurityNumber;
    CString Department;
    CString Manager;
}
```

The above definitions of Store and Read will also be extended in the new version of the software in a way that will be apparent to those of ordinary skill in the art. After use with the new version of the software system, the persistent data will appear as:

```
John*Doe*123456789*FrontPage*JackSprat+Jane*Smith*23
4567890*FrontPage+CharlesNoman
or
FirstName*John*LastName*Doe*SSN*123456789*Department
*
FrontPage*Manager*JackSprat+FirstName*Jane*LastName*
Smith*
SSN*234567890*Department*FrontPage*Manager*CharlesNo
man
```

But, when these data are presented to the old software system, which is not programmed to deal with the new Manager data attribute, the old software system will either fail, because it expects the + object separator, or it will skip over the unexpected data attributes to the + separator. In any case, the Manager data attribute will be discarded and thus will not be available when the data are again loaded into the new version of the software in which Manager and the * separator are understood.

From the preceding discussion, it will be apparent that the prior art does not provide a complete solution to preserving formatting, layout, and attributes in a document within different environments or systems. Accordingly, there is a need for a method that addresses this problem, by preserving formatting and other attributes of objects in a document or other file that is created in one environment, but opened and saved in a different environment. Also, when changes are made to such a document in the different environment, it is preferable that these changes substantially conform to a style that is derived from that of the original document or file.

SUMMARY OF THE INVENTION

In accord with the present invention, a method is defined for preserving attributes of a persistent object stream in a file that includes at least one object when the file is opened in a different environment than that in which the file was originally created. The method includes the step of creating a copy of attributes associated with each object when reading the file in the different environment. These attributes include any that are unknown to the different environment, and these attributes associated with each object that are unknown to the different environment are ignored. When writing the file, known attributes associated with each object that are changed in the different environment are merged with the copy of the attributes associated with the object, including any attributes that are unknown in the different environment.

Objects in the file may include text entries having whitespace attributes. A whitespace attribute that is associated with a text entry is preserved in the copy unless changed while the file is open in the different environment. Also, objects in the file may include tag entries having whitespace attributes, and a whitespace attribute associated with a tag entry is preserved in the copy unless changed while the file is open in the different environment. Objects in any class that is unknown in the different environment are preserved in the copy and are ignored in the different environment, but are merged with known objects when the file is written.

In one embodiment, attributes for an object that is unknown to the different environment include a function associated with the object that is not recognized in the different environment, but is recognized in the environment in which the object was first added to the file.

The method also can include the step of parsing the file to identify the persistent object stream. A different internal representation of the attributes associated with objects in the file is employed in the copy that is created. Attributes from the persistent object stream are determined when the file is opened. These attributes are then associated with any related new objects that are added to the file while the file is open, so that attributes of the related new objects are consistent with the persistent object stream. In any case, it is generally preferable to minimize changes to attributes associated with the object in the file when it is saved.

Another aspect of the present invention is directed to a computer-readable medium having computer-executable instructions for performing the steps initially discussed above.

Yet another aspect is directed to a system that includes a memory in which data and machine instructions are stored, a display on which graphics and text are presented to a user, a processor that is coupled to the memory and executes the machine instructions, and a user input device adapted to enable the user to input data and to control the processor. When executed by the processor, the machine instructions cause the processor to implement functions that are generally consistent with the steps of the method set forth above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

As noted in the Background of the Invention, the present invention has broad application to preserving attributes of objects of a file (including software, a document, or data) created within one environment, when opened within a different environment and then saved. This functional description of the invention is somewhat general. A more specific application of the present invention will better clarify how the invention operates. Accordingly, the following describes how the present invention is applied to preserve attributes of objects in an HTML document that has been created with a text editor in which the user has almost complete control of the layout and format of the HTML document. When creating an HTML document with a text editor, a user can readily apply preferences in setting indentation level, tab spacing, line breaks, and other aspects of formatting and layout. These preferences comprise attributes of the text and other objects within the HTML document. The present invention facilitates retention of these attributes when the document is opened, possibly modified, and then saved in an HTML editor that implements the present invention.

In an HTML document, a number of different objects or elements are employed including scripts, comments, style sheets, and non-HTML tags; however, the two principal types of objects are plain text and HTML tags. Plain text typically comprises one or more words surrounded by and/or separated by whitespace; HTML tags are used for layout and specifying how the text and other object in an HTML document will appear (i.e., their format) in a web page that is based on the HTML document when the page is viewed in a browser. The other types of objects in an HTML document that were first mentioned are less common, and not so relevant to the present invention, since preservation of the attributes associated with them when an HTML document is opened in an HTML editor is less likely to be a problem. In any case, other types of objects can be handled in the same manner as text objects and HTML tags, if it is necessary to preserve their attributes.

A simple example of an HTML document is as follows:

```
<body>
    <p align = 'center'>
        Hello World!
    </p>
</body>
```

In the preceding example, the words "Hello" and "World!" are plain text elements, while "<body>," "<p>," and "</p>," and "</body>" are HTML tags. Clearly, this example is very simple; most HTML documents include many more lines of text objects and HTML tags, along with many other types of objects.

Figure 1:
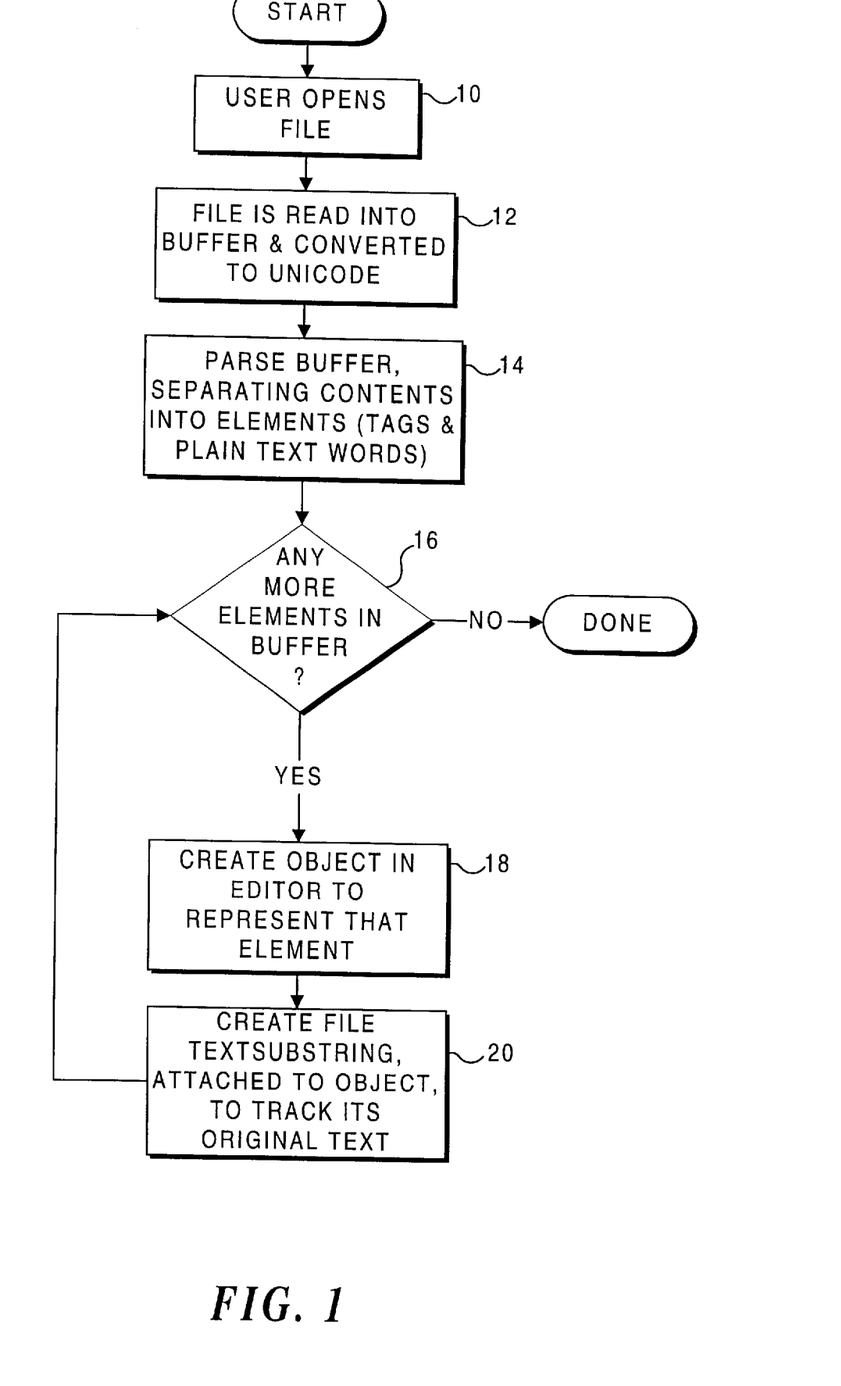
FIG. 1 is a flow chart illustrating the steps implemented when a document is loaded into an editor that implements the present invention.

FIG. 1 illustrates the steps that are implemented when an HTML document originally prepared with a text editor is opened in an HTML editor implementing the present invention, starting with a block 10. A parser reads the entire HTML document in from disk or other non-volatile storage, converts the HTML document to unicode, and stores the unicode in a special buffer referred to as a FileText Buffer, as indicated in a block 12. In a block 14, the special buffer is parsed from its beginning, separating its contents into the various elements or objects, including HTML tags and plain text words. The parser keeps track of the starting and end point for each object referenced within the special buffer, since these two numbers can subsequently be used to access a FileTextSubstring (or substring) from the buffer. These numbers comprise a start point and end point for each substring.

A decision block 16 determines if there are any more elements or objects in the buffer being parsed, and if not, the parsing of the buffer is completed. However, if additional elements exist, a block 18 provides for creating an object representing the current element in the HTML editor. Further, a block 20 provides for creating a FileTextSubstring, which is attached to the object, to track the original text for that object. The logic then loops back to decision block 16 to determine if there are any more elements to be processed in accord with blocks 18 and 20.

A substring is the primary mechanism by which the HTML editor represents original text of an HTML document, without actually needing to copy the text. Thus, a substring, which is contained within the special buffer, is a reference back to the original text. The data in a substring includes a pointer to its position in the buffer and includes the length of the substring (in unicode characters). Also included in the substring is the number of characters on either side of the substring (i.e., of the text element) comprising its surrounding whitespace. A reference count is maintained for the special buffer so that the act of creating, copying, or deleting a substring referencing the special buffer adjusts the reference count. Even if the document or file for which the special buffer was created is closed, the special buffer is maintained in memory so long as an object using the special buffer remains open on the system.

An example of the components of a substring for the HTML tag element "<p>" in the simple example of an HTML document set forth above follows. In this substring, it is assumed that each line break is a carriage return, line-feed pair, and that indenting of the text is done using tabs.

| Buffer location: | [memory address of buffer] |
|---|---|
| Starting position: | 9 |
| Length: | 20 |
| Leading whitespace: | 3 (CR, LF, Tab) |
| Trailing whitespace: | 4 (CR, LF, Tab, Tab) |

During modification by a user of an HTML document that is open in the HTML editor, elements of the document are typically moved around and copied from one place to another. Since each element tracks its own original text information via its associated substring variables, like those noted in the preceding example, such modifications do not prevent the original text referenced by the substring variables from being regenerated. Each time that an element is copied inside the HTML editor in accord with the present invention, the substring for the element is also copied, thereby insuring that not only the original text is preserved, but also the whitespace and other attributes of each of the element comprising the HTML document are preserved.

One type of modification that is difficult to apply without adversely impacting on the original look and style in which the HTML document was created occurs when the whitespace between previously created elements is modified without altering the text of those elements. It is for this reason that substrings store both leading and trailing whitespace attributes, i.e., to insure that every change in the HTML document causes an examination of the effect it has on the local whitespace around the elements where the change occurred. In some cases, it may be necessary to suppress the whitespace of a substring while preserving the internal original text referenced by the substring.

Whenever the HTML document is saved, any substrings that have suppressed whitespace attributes can be formatted in accordance with predefined rules so that the elements are provided with whitespace in accordance with those rules. Alternatively, the whitespace provided to elements for which the original whitespace referenced by the substring has been suppressed can be provided with whitespace corresponding to related elements in the original HTML document. In this manner, the whitespace applied to elements having suppressed whitespace attributes in their substring will at least be consistent with the whitespace applied to corresponding elements in the original document that was opened in the HTML editor.

When HTML tags are modified, no matter how much the user has edited them, the original text included within the tag is a useful guide for formatting the final output and is therefore not discarded. In contrast, when plain text is edited, even if only a portion of the internal text of the plain text element is changed, the substring associated with the plain text element is discarded. The modified text is then included in the HTML document when saved, in the form in which the text was entered. However, any words in a plain text element originally in the document when it was first opened in the HTML editor that remain unchanged are preserved.

It should be noted that the substrings associated with plain text objects only track preceding whitespace, and do not include trailing whitespace, as do the substrings for HTML tags. A substring for plain text does not need to track trailing whitespace, because when words are inserted between existing words that were on separate lines in the original text, it would be inappropriate for the new text to be placed on a new line between the original two lines. Instead, the new text that was inserted should be appended to the end of the first line. However, this result would not be possible if the previous word in the first line preserved its whitespace, e.g., a trailing line break.

Figure 2A:
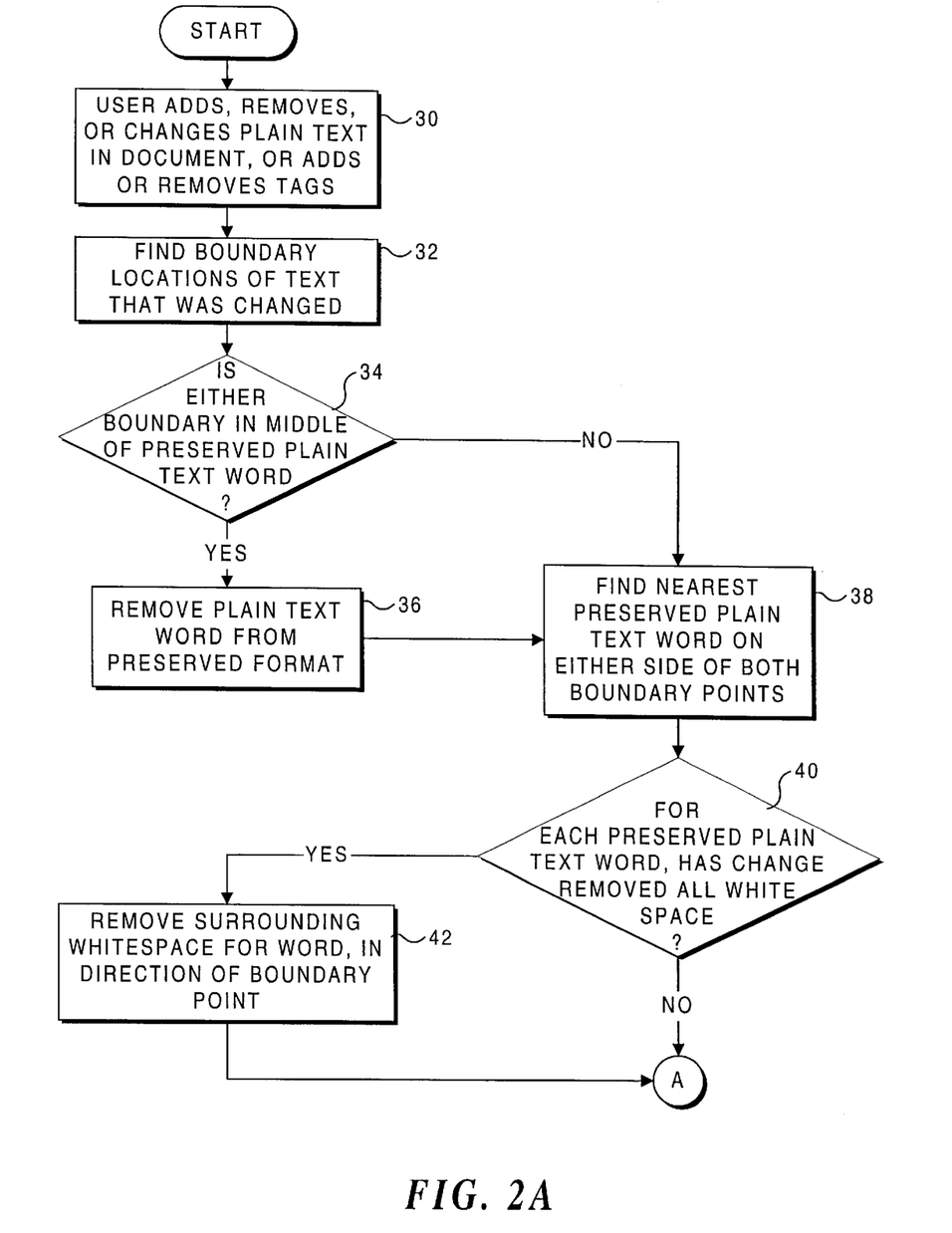
FIGS. 2A and 2B illustrate a flow chart showing the steps implemented by the editor when a user modifies the document of FIG. 1.
Figure 2B:
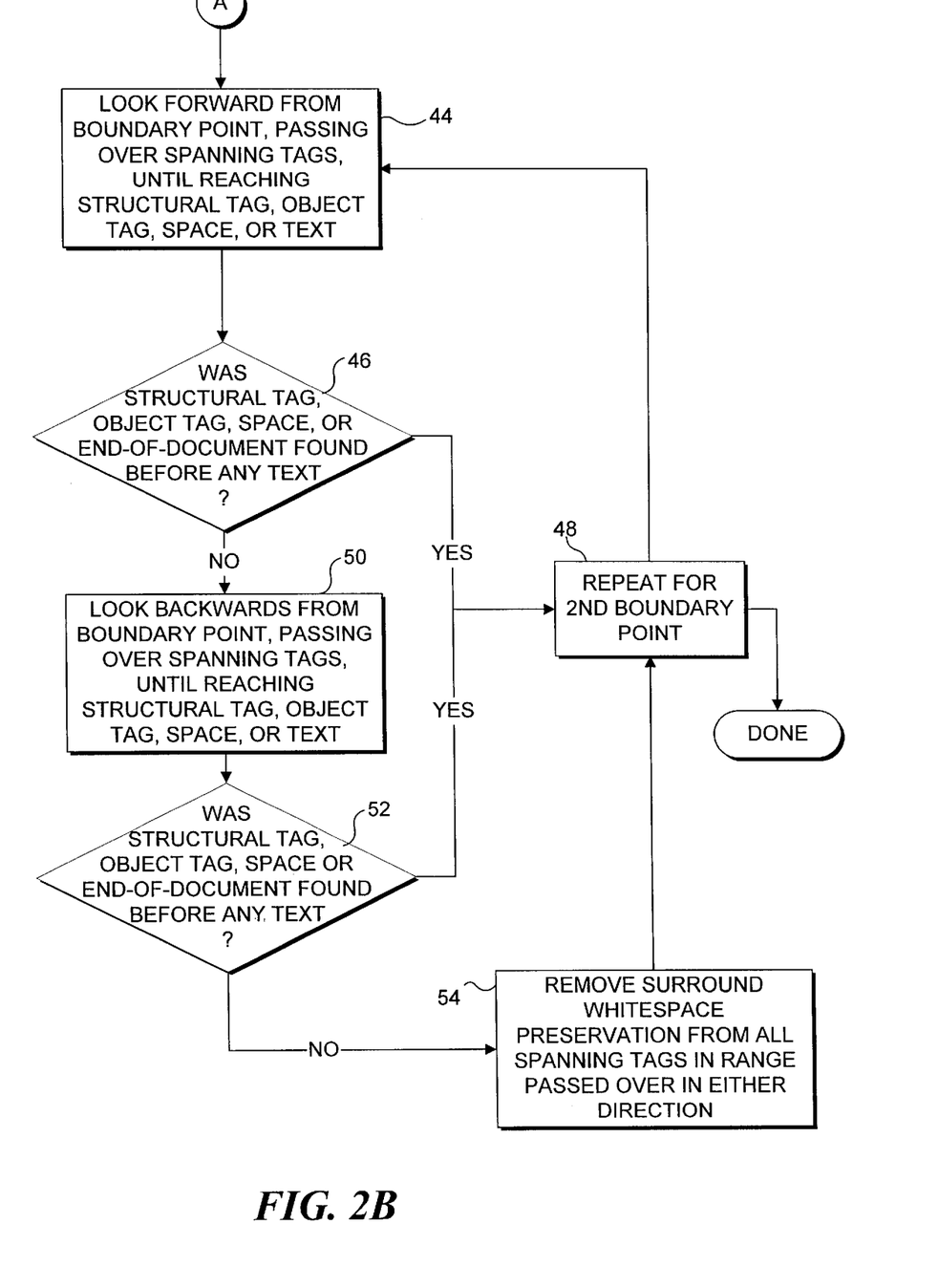

FIGS. 2A and 2B generally summarize the logic involved in the present invention in regard to modification of a document opened in the HTML editor, where the document was originally created in a plain text editor. In a block 30, the user makes a change to the open document by adding, removing, or changing plain text, or by adding or removing one or more HTML tags. In a block 32, the logic determines the boundary locations, i.e., the start and the end, of any text that was thus changed by the user. A decision block 34 determines if the beginning or end boundary for the text that was changed is in the middle of a preserved plain text word. For example, if the user has corrected the spelling of a word that was originally in the document by adding or changing a letter in the middle of the word, decision block 34 would return an affirmative response, and the logic would proceed to a block 36. In block 36, the plain text word that was modified by the user is removed from the preserved format.

Thereafter, or following a negative response to decision block 34, a block 38 provides for finding the nearest preserved plain text word on either side of the beginning or end boundary points of the changes to the plain text. A decision block 40 then evaluates each of the preserved plain text words. In this decision block, the logic determines whether the change by the user has removed all whitespace associated with a preserved plain text word. If so, a block 42 provides for removing the surrounding whitespace for the word in the direction of the boundary point. Following block 42 or a negative response to decision block 40, the logic continues on FIG. 2B, beginning with a block 44. In block 44, the logic provides for looking forward from the current boundary point, while passing over any spanning tags that may be found, until reaching a structural HTML tag, an object HTML tag, a space, or text. Generally, there are three kinds of HTML tags, the simplest being referred to as a "spanning" tag, and including tags such as <a>, <b>, <font>, <strong>, etc. Browsers use spanning tags primarily to modify a font in which the text inside a span is displayed. A "structural" tag determines the layout of a page (e.g., tags such as <body>, <table>, or <p>), while a "no-scope" (or perhaps better referred to as an "object") tag represents a visual object like a picture or active control (e.g., tags such as <img>, <object>). The distinction between structural and object tags is subtle, but is very important when dealing with whitespace. Because structural tags cause the page to lay out differently, whitespace next to a structural tag in an HTML document has no meaning, and the user can have as much or as little whitespace next to a structural tag as desired, without effect. Object tags by contrast, usually represent displayable elements that are fitted in with the text of the document. Therefore, the user needs to pay attention to the whitespace provided around them just as the user would for plain text words.

A decision block 46 then determines if the structural tag, object tag, space, or an end of document was found before any text was found. If so, the logic proceeds to a block 48, which loops back to block 44 and provides for repeating the steps carried out starting in block 44, for the other boundary point associated with a change.

A negative response to decision block 46, leads to a block 50. In block 50, the logic looks backwards from the current boundary point, passing over any spanning tags, until reaching a structural tag, an object tag, a space, or text. A decision block 52 then determines if the structural tag, object tag, space, or end of document was found before any text or object tag. If so, the program again loops through block 48 and back through block 44, repeating the test for the other boundary point. If the response from either decision block 46 or 52 for the other boundary point was affirmative, the procedure is completed. A negative response to decision block 52 leads to a block 54, which provides for removing the surrounding whitespace preserved in regard to all spanning tags that are found in the range that was passed over in either direction, when carrying out the steps in block 44 and 50. Thereafter, the logic again returns to block 48, to repeat the steps starting at block 44, for the second boundary point. Again, once the logic has been completed for the second boundary point, this procedure is concluded.

Figure 3:
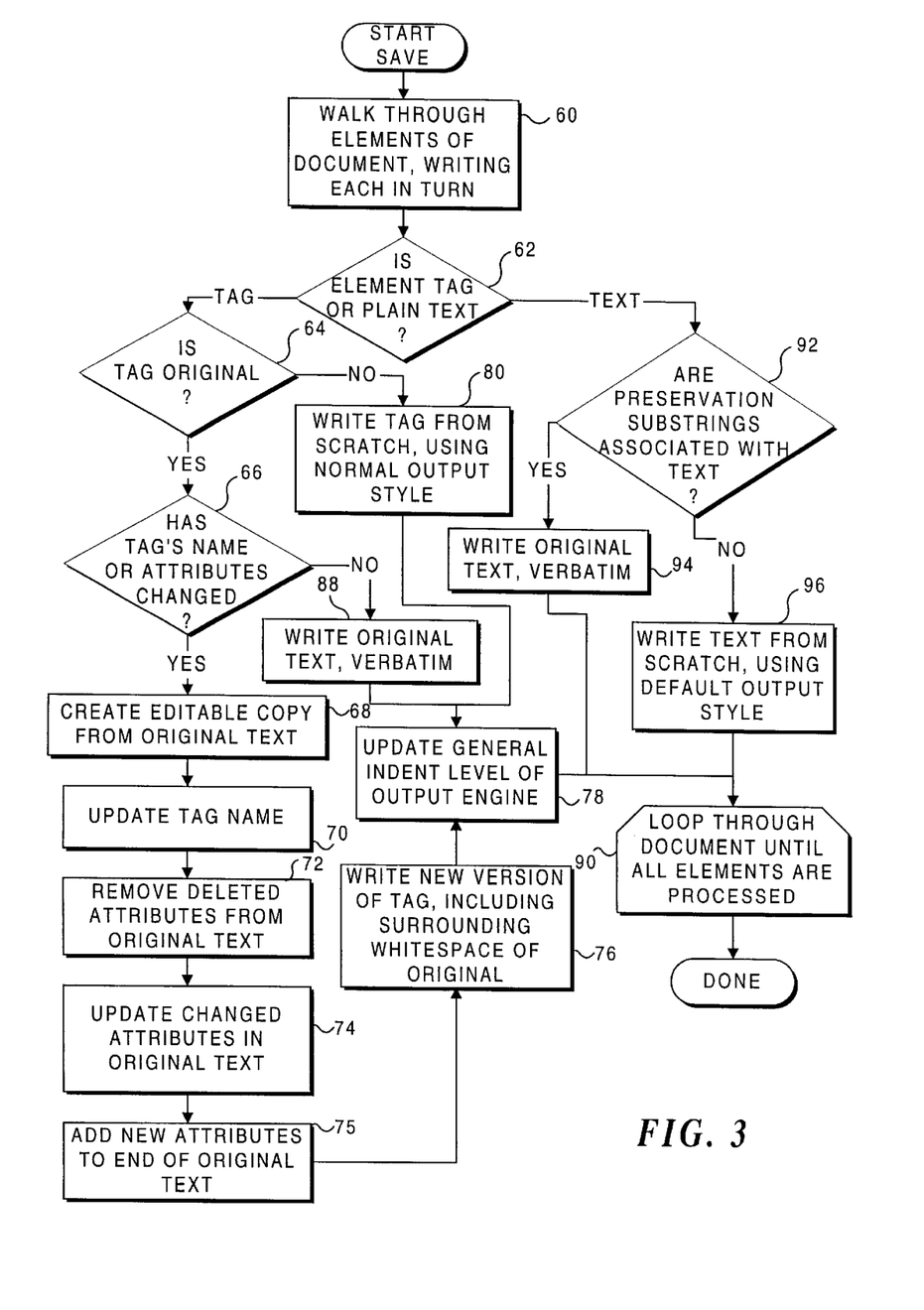
FIG. 3 is a flow chart illustrating how attributes of objects in the document opened in the editor are preserved when the document is saved.

After the user has completed any additions, changes, or deletions to a document that is opened in the HTML editor, FIG. 3 illustrates the steps that are employed for preserving attributes of the objects of the HTML document, including the plain text and HTML tags, when the document is saved. Specifically, this Figure determines when original text is preserved and when not. The logic employed in FIG. 3 begins with a block 60, which provides for walking through the various elements of the document, writing each to memory, e.g., to storage in a file on a hard drive. A decision block 62 determines if an element is an HTML tag or plain text. If the element is an HTML tag, a decision block 64 determines if it is an original tag that was in the HTML document when it was opened in the HTML editor. If so, a decision block 66 determines if either the name of the HTML tag or the attributes have changed during the editing of the document by the user. If so, a block 68 creates an editable copy of the original text included in the HTML document when it was opened in the HTML editor. The name of the current HTML tag is updated in a block 70 to reflect the new name if it was changed. Further, any deleted attributes for HTML tags are removed from the original text, in a block 72. A block 74 provides for updating any changed attributes for tags in the original text. In a block 75, any new attributes are added to the end of the original text. A block 76 writes a new version for each HTML tag, including the surrounding whitespace of the original HTML tag if it was changed, to memory for use by an output engine in updating the general indent level, in a block 78.

Referring back to decision block 64, a determination that the HTML tag currently being processed was not in the document originally opened in the HTML editor leads to a block 80, which provides for writing the tag from scratch, using a predefined "normal" output style. The logic then proceeds to block 78.

Referring back to decision block 66, if the name of the HTML tag or other attribute of the element is not changed, a block 88 provides for writing the original text comprising the HTML tag without any change. The logic then again proceeds to block 78. Following the update to the general indent level used by the output engine, the logic proceeds to a block 90, which provides for looping through the document until all elements have been processed. In accordance with block 90, the logic returns to block 60, to process the next element identified in the document.

Assuming that an element identified in block 60 is plain text, the results from decision block 62 lead to a decision block 92, which determines if any preservation substrings are associated with the text. Such substrings would be associated with text that was originally in the document when it was first opened in the HTML editor. If so, a block 94 provides for writing the original text without change to the file in which it is to be stored. Conversely, if a preservation substring is not associated with the text, the plain text is new. In this case, a block 96 provides for writing the text as newly entered, i.e., from scratch, using the default output style for that type of text based upon the style guide for the original text opened in the HTML editor, or if unavailable, a predefined default style. Thereafter, the logic proceeds to block 90, either from block 94 or from block 96, so that the remaining elements in the document are processed. Once all elements in the document have been processed in this manner, the procedure concludes.

Figure 4A:
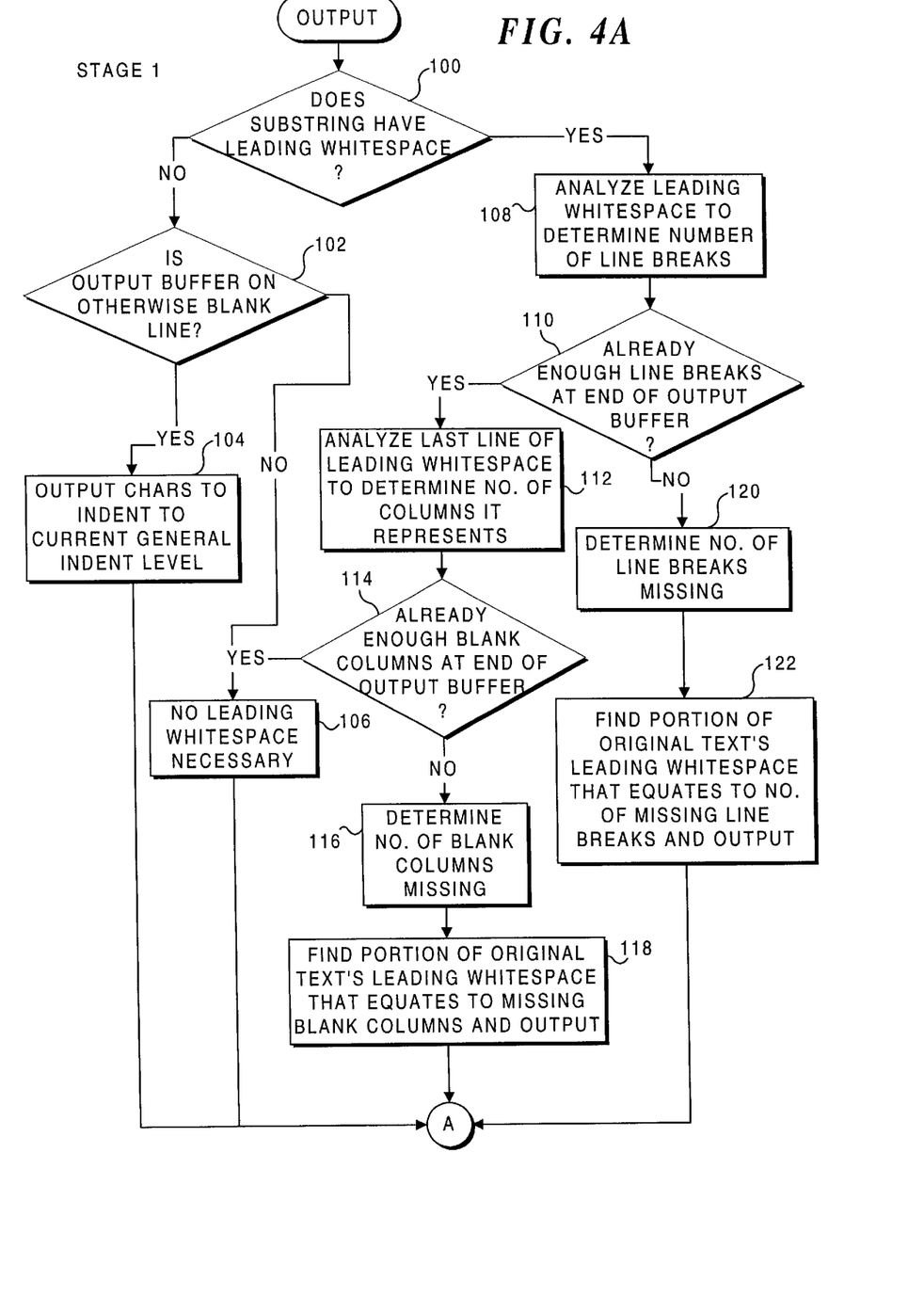
FIGS. 4A and 4B illustrate a flowchart showing the steps implemented when a substring and associated whitespace for an object in the document are output.
Figure 4B:
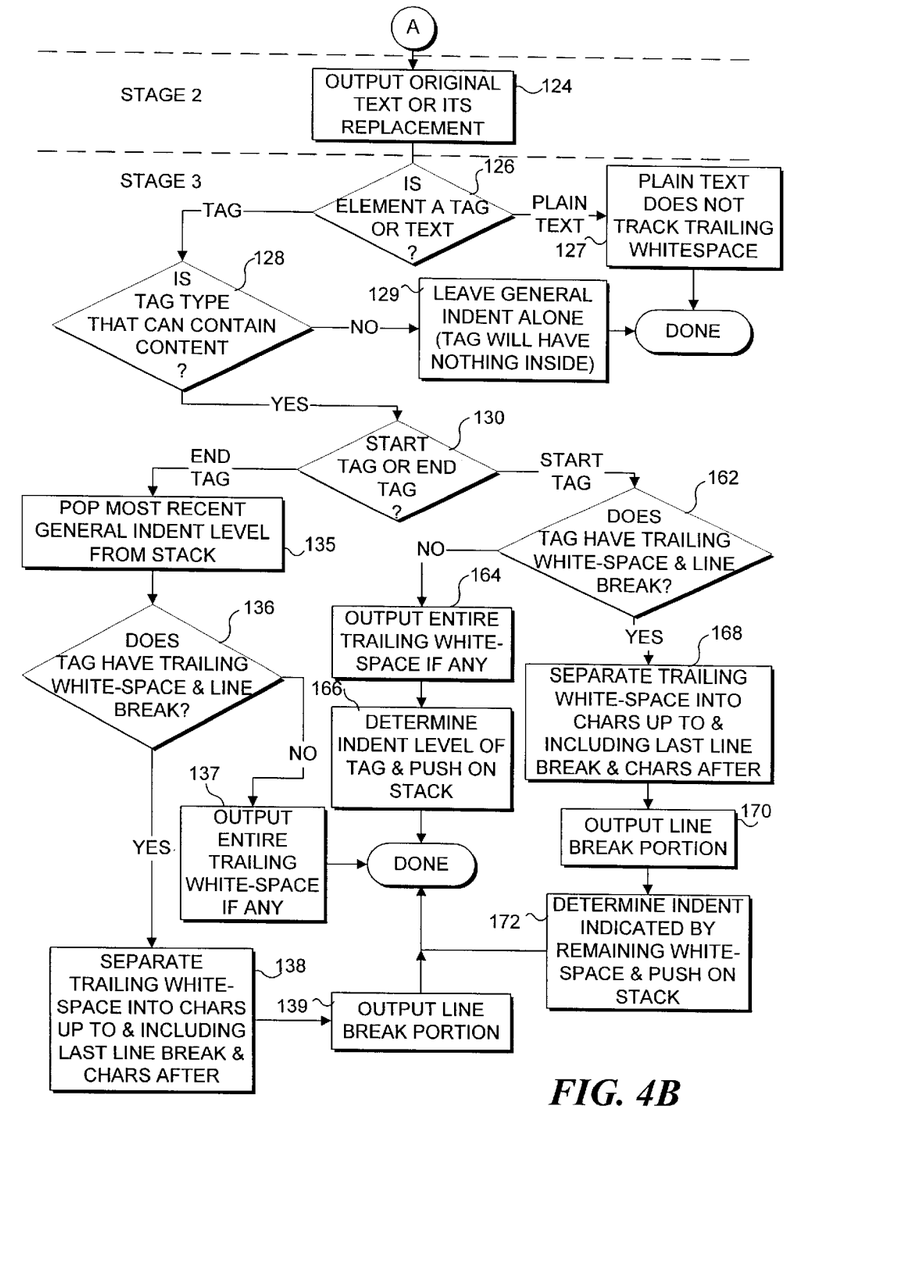

FIGS. 4A and 4B describe the steps involved in writing a substring for an object, including its surrounding whitespace, when saving an HTML document. This procedure is generally divided into three stages of which stage 1 appears in FIG. 4A, and stages 2 and 3 are shown in FIG. 4B. Beginning at a decision block 100 in FIG. 4A, the logic determines if a substring that is being saved has any leading whitespace associated with it. If not, a decision block 102 determines if the output buffer is receiving data for a line that is otherwise blank. In other words, the combination of decision blocks 100 and 102 determine if the current substring is for an element such as plain text, which has no leading whitespace and which is going to be the first element on a new line. If so, a block 104 provides for outputting the characters in the current element with an indent level corresponding to the current general indent level, thereby insuring that the indent level is at least consistent with that of elements in a line immediately preceding the current line. The logic then continues in FIG. 4B at a block 124.

However, referring back to decision block 102 in FIG. 4A, if the portion of the document being transferred to the output buffer to be saved is not going on an otherwise blank line, the logic proceeds to a block 106, which indicates that no leading whitespace is necessary, since either the element in the original document followed its preceding element without any spaces, or the line to which it is being output already has any whitespace it needs. The logic thereafter again proceeds to block 124 in FIG. 4B.

If the response to decision block 100 in FIG. 4A is affirmative, indicating that the current substring has leading whitespace, a block 108 provides for analyzing the leading whitespace to determine the number of line breaks that it includes. A decision block 110 determines if there are already a sufficient number of line breaks at the end of the output buffer for the preceding line and if so, a block 112 provides for analyzing the last line of leading whitespace to determine the number of columns it represents. A decision block 114 determines if there are already sufficient blank columns at the end of the output buffer for the preceding line. If so, the logic again leads to block 106, indicating that no more leading whitespace is necessary. A negative response to decision block 114 leads to a block 116 to determine the number of blank columns that are missing from the output buffer for the preceding line. A block 118 then finds the portion at the end of the original text's leading whitespace corresponding to the missing blank columns and output. Thereafter, the logic again proceeds to block 124 (in FIG. 4B).

Again referring back to FIG. 4A, a negative response to decision block 110, indicating that there are not sufficient line breaks at the end of the output buffer, leads to a block 120, to determine the number of line breaks that are needed. A block 122 then finds the portion at the end of the original text's leading whitespace that corresponds to the number of missing line breaks. This portion of the original text is output and saved to the file. Thereafter, the logic again advances to block 124.

Referring to FIG. 4B, block 124 is the only portion of the flowchart corresponding to stage 2 of the process for saving a document that has been opened in the HTML editor. This block provides for output of the original text or its replacement text into the file that is being saved.

In stage 3 of the save process, a decision block 126 determines if the substring or element currently being processed is a tag or text. If the element is text, the logic is concluded, because text does not track trailing whitespace. If, in block 126, the element is a tag, a decision block 128 determines if the tag is of the type that can have contained "content," i.e., if the tag can include other elements. If not, a block 129 provides for leaving the general indent level alone, because this tag will not have anything within it. Following block 129, the logic is concluded.

However, if the response to decision block 128 is affirmative, a decision block 130 determines if the tag is either a start tag or an end tag. If it is an end tag, a block 135 provides for popping the most recent general indent level off of the stack, thereby reverting to the previous level. A decision block 136 determines if the tag has trailing whitespace and a line break, and if not, a block 137 concludes the logic flow after output of the entire trailing white-space, if any. Otherwise, a block 138 indicates that the trailing white-space is separated into those characters up to and including the last line break, and the white-space characters after the last line break. In a block 139, the line break portion is output, and the logic concludes.

Returning to decision block 130, if the tag is a start tag, a decision block 162 determines if the tag has any trailing white-space and if it has a line break. If not, a block 164 provides for output of the entire trailing white-space, if any. A block 166 determines the indent level of the tag being processed, which is often the same as the general indent level, but can be different. The indent level of this tag is then pushed onto the general indent level stack, concluding the flow of logic. If in decision block 162, the tag has trailing white-space and a line break, a block 168 indicates that the trailing white-space is separated into those characters up to and including the last line break, and into the white-space characters after the last line break. In a block 170, the line break portion of the trailing white-space is output. A block 172 then determines the indent level indicated by the remaining white-space and pushes that level on to the general indent level stack. The logic again concludes.

In summarizing the logic implemented in writing out substrings during the saving of an HTML document, the first stage considers the leading whitespace in each substring and determines the number of line breaks and blank columns or spaces that should precede the current element being processed. Whitespace existing at the end of the output buffer is checked to determine that it has at least the required whitespace. However, if less than the required amount is provided in the output buffer, characters from the original text are used to replicate the required nuances of the whitespace. Thus, tabs remain tabs, spaces remain spaces, blank lines that had a specified number of spaces in them retain those spaces, etc.

Referring to the simple example of an HTML document presented above, it should be noted that prior to the <body> HTML tag, there is no whitespace, so block 106 in FIG. 4A would apply, indicating that no leading whitespace is necessary. In regard to the <p> HTML tag, there are three whitespace characters. Analysis of these three characters determines that they represent one line break and four blank columns (assuming that a tab corresponds to four spaces). If the last characters that are written to the output buffer are not whitespace, then the entire original text of the leading whitespace is written in the first stage of the process. However, if there is some original whitespace already in the output buffer, for example, two line breaks and a single space or one blank column, then stage 1 of the procedure would determine that three columns were still needed. To provide the three columns, it would use whatever portion of the original leading whitespace it needed to meet the requirement. In this case, it would simply write out the tab from the original leading whitespace.

If the output buffer is receiving input for a new line, an original element will contain information in the leading whitespace of its substring causing it to indent properly. A new element, which has no original substring associated with it, or an original element that has changed in such a way that leading whitespace preservation has been discarded, is formatted by indenting it to the current indent level. This procedure produces a document in which the text and other elements are consistently indented, easy to read, and follow the style of the original HTML document opened in the HTML editor.

In the second stage, when writing out a substring, the original text portion is written to memory by simply copying the text from the original File Text Buffer into the output buffer. If an element has been changed by the user, the procedure attempts to alter the original text as little as possible while still carrying out the change(s) made by the user. Thus, in the exemplary HTML document set forth above, a change to the text in the HTML tag "<p align='center'>" to add a new attribute "color=red" would be implemented by adding the new attribute to the original text, yielding "<p align='center' color=red>". Further, if the original text for the attribute "align" is changed from 'center' to 'right', the same spacing and use of quotes would be maintained, yielding "<p align='right'>".

In the third stage, trailing whitespace is considered. If no edits are made to the part of the document being saved, the trailing whitespace of one element is equal to the leading whitespace of the next element. Thus, the code implementing handling of leading whitespace in stage 1 in FIG. 4A recognizes that the whitespace currently at the end of the output buffer is identical to the whitespace it was about to output and therefore does not need to add any additional whitespace. If edits occur around a tag element, output of the trailing whitespace insures that the style of the original text is maintained.

In order to avoid adversely affecting the indent model employed by the user, only the portion of the whitespace that represents line breaks is output at this point. The final spaces and/or tabs employed to indent the next line are not yet output. This technique works properly because if the next element is part of the original document, its leading whitespace will complete the indenting required without reference to the trailing whitespace from the preceding line. However, if the next element is not original, or if its leading whitespace has been suppressed as a result of editing changes made by the user, the steps implemented in stage 1 of the process will still cause appropriate spacing or indenting to be applied.

In regard to HTML tag elements (but not plain text elements), the third stage of the procedure includes a final step. Each structural HTML tag updates the indent level of the output engine for any text that it contains. As noted above in regard to the description of FIG. 4B, a general indent stack is used for maintaining the indent level so that when the end of a structure is reached, its indent level can be popped off the stack, enabling a previous indent level to come back into effect. If the tag is a last item on a line, its trailing whitespace can be used to determine what the indent level for the next line is for used by the output engine. If the tag is not the last item on its own line, then the contents should not be further indented. But, to the extent that they wrap, the contents of that line should at least wrap to the same level as the current line for the tag. It will be noted that this step does not change the indent level at all, but is employed simply to keep the stack in sync with the tag list. For example, when writing out the substring for <p> set forth above, only the carriage return, line feed would be output during stage 3 of the procedure. However, the general indent level would be changed to two tabs. If the word "Hello" is the next element to be output, its leading whitespace will cause the two tabs to be added automatically during stage 1 of the procedure. Alternatively, if any new text has been inserted at that point, that new text will still be indented by two tabs, making it consistent with a general indent level at that point in the document.

In one preferred embodiment of the present invention, special symbols and characters from foreign languages are treated as separate plain text elements, even if there are no spaces between them in the original text. Doing so insures that such symbols and characters are preserved and not modified simply because they are not normally used within the HTML editor. For example, the copyright symbol "©" can be written in the preceding manner, or can be represented in text as "©." Similarly, an em-dash can be directly represented in text, or can be represented by the form "—." Preserving the original representation chosen by the user avoids problems with character set usage in the file or document when it is later opened in a different environment. The present invention uses the substring code to insure that the representation chosen by the user in the original document is never arbitrarily replaced by some substitute.

The present invention as implemented in a software program is able to write HTML tags with any list of attributes, both known and unknown when saving an HTML document that has been opened in the HTML editor. As will be apparent from the preceding description, the present invention provides for separating HTML tags with line breaks and indenting lines that include HTML tags, and hiding tags that are optional. Similarly, the present invention preserves plain text, including entities such as foreign language characters and special characters, and wrapping lines that are too long to fit in a predetermined display width. More importantly, the present invention permits the user to customize the functions by defining preferences for indent level, specifying HTML tags that indent their contents, indicating HTML tags that should add line breaks, specifying the location of the right margin to determine where line wrapping occurs, etc. The user may elect to apply such customization to a document that has been opened in the HTML editor so that the default output engine consistently writes such a file in a way defined by the user each time that an HTML document is saved. In this case, preserving attributes of the HTML file has a lower priority, while the customization option selected by the user has a higher priority in determining the overall look and formatting of the HTML document created in a different environment that has been opened and then saved by the HTML editor.

However, because the degree to which a user would have to define such formatting preferences when customizing settings for a HTML editor need to be rather extensive to cover all possible options, it is preferable for the HTML editor incorporating the present invention to determine attributes originally applied in the HTML document that has been opened within the editor to determine user preferences that should be applied to plain text and HTML tags that are either changed or added to the document. The software implementing the present invention thus determines or estimates style guidelines that the user employed when originally creating the document that are optionally applied to changes to the document to maintain a consistency with the document as originally created.

While the present invention has been described above in connection with its application to an HTML editor, it should be apparent that the present invention is also applicable to other types of applications. For example, it can be included in almost any software where objects (or attributes associated therewith) that are included in a file may be changed when the file is opened in an environment different that that in which the file was created. For example, as noted previously, it is common for new versions of a word processing program to include functions that were not recognized in earlier versions of the word processing program. Simply opening a file created in the new version of the word processing program in an older version should not cause loss of the attributes associated with the objects having such new functions, i.e., should not preclude those objects and their new functions from being implemented when the file has been saved in the older program and then subsequently reopened in the newer version of the word processing program. Similarly, the present invention is useful in systems for developing software programs, since a newer version of such a system may provide for objects and/or attributes that are not recognized in an earlier version of the system. It will be apparent that it is important to preserve such objects and their attributes if a file created in a newer version is opened in an older version of the system and then saved, so that subsequently, when the file is opened in the newer version of the programming system, it will still include the new objects and/or their new attributes.

Figure 5:
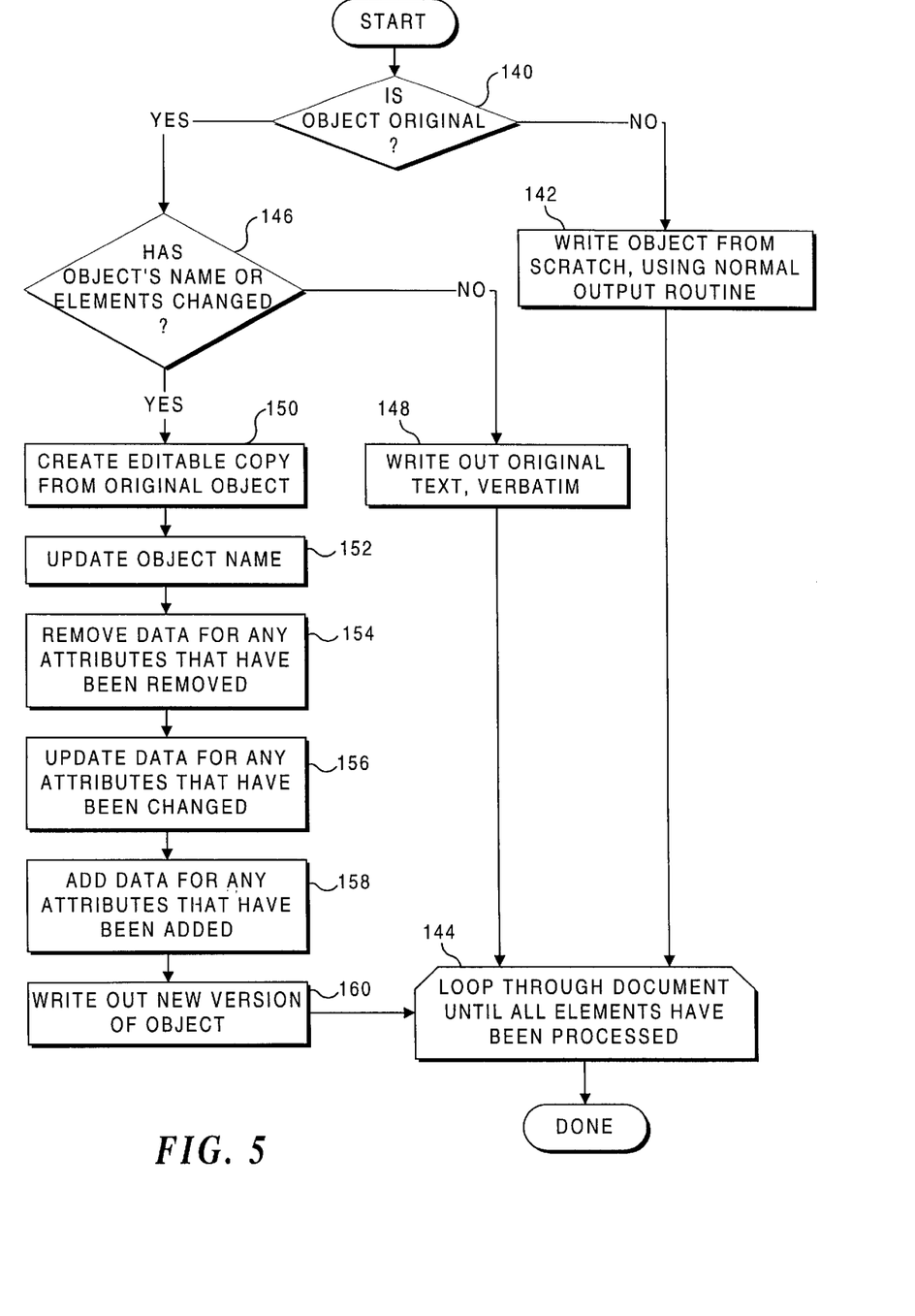
FIG. 5 is a flow chart illustrating the steps implemented to preserve attributes of objects when a file is saved, and more specifically, to determine whether original text in a file is preserved when the document is saved.

The logic employed for preserve elements and attributes in an HTML document is generally applicable to maintain a persistent object stream when a file is opened in a different environment from that in which it was originally created. Those of ordinary skill in the art will readily appreciate how the flowcharts discussed above can be modified to apply to the more general case to which the present invention is also applicable, including language development systems and databases, particularly object oriented databases, where the attributes of an object that are recognized in a later version are preserved when a file containing the object is opened in an earlier version of the programming system, database program, or other environment that does not recognize the attributes of the object. FIG. 5 defines the steps employed when saving a file that has been opened in a different environment from that in which it was originally created. These steps will be observed to closely parallel those discussed above in connection with FIG. 3.

In FIG. 5, the present invention provides for walking through the objects that should persist in the file, writing each in turn to the file being stored, e.g., on a hard disk or other memory media. A decision block 140 determines if the current object is original, so that the object is represented by a substring referencing its original text and its attributes. If not, the object is likely new, and a block 142 provides for writing the object from scratch to the memory media, using a normal or default output routine to determine the attributes that should be saved with the object. These attributes will be those recognized by the environment in which the file is being saved. A block 144 provides for looping through the document or file until all elements have been processed.

Assuming that the current object is one that was originally in the file when it was first opened, a decision block 146 determines if the object's name or the elements to which it relates have been changed since the file was opened. If not, a block 148 provides for writing out the original text or other attributes of the object without any change. Again, the process would loop back through the file or document to identify any other elements that need to be processed, as indicated in block 144.

A positive response to decision block 146 leads to a block 150 in which an editable copy is created from the original object and used to hold the attributes of the original object. The user can selectively add, remove, or change these attributes to generate a new copy of attributes for the object. In the event that the name of the object has been changed since the file or document was originally opened, a block 152 provides for updating the object name. A block 154 provides for removing data saved in a substring or any attributes that have been removed from the file since it had been opened.

In a block 156, the data for the object currently being processed are updated to reflect any attributes that have been changed in the object. In addition, a block 158 adds data in regard to the current object being evaluated, to reflect any attributes that have been added during the time that the file has been opened. Using the updated or added data for the object, a new version of the object is then written to the file to reflect changes made while the file was opened. Again, in accord with block 144, after all the elements in the document or file have been processed, the procedure is complete.

Personal Computer System Suitable for Implementing the Present Invention

Figure 6:
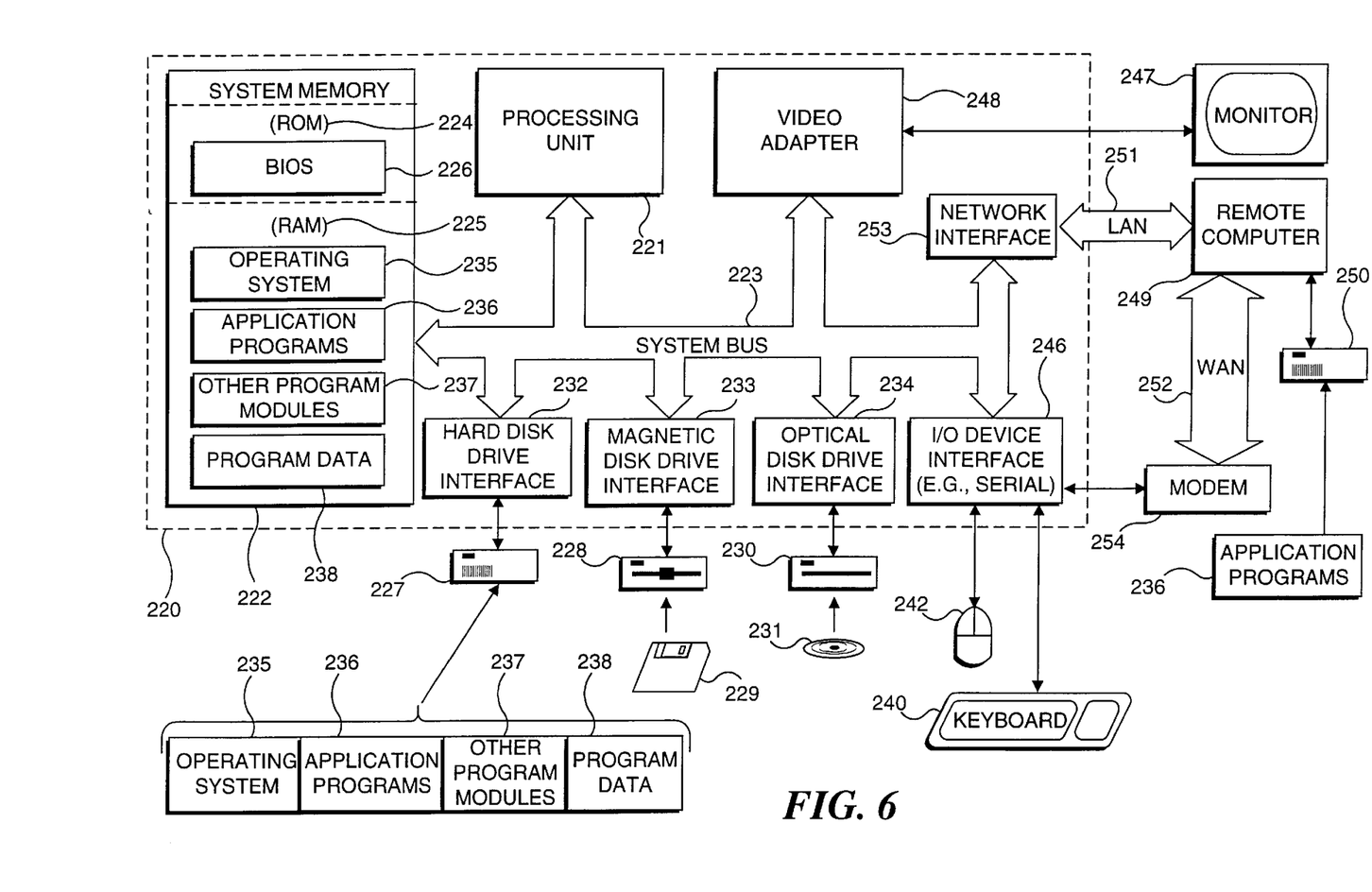
FIG. 6 is a schematic block diagram showing functional components of a personal computer that is suitable for implementing the present invention.

FIG. 6 and the following discussion are intended to provide a brief, general description of a suitable computing environment in which the present invention may be implemented. Although not required, the present invention will be described in the general context of computer executable instructions, such as program modules, being executed by a personal computer. Generally, program modules include routines, programs, objects, components, data structures, etc. that perform particular tasks or implement particular abstract data types. Moreover, those skilled in the art will appreciate that this invention may be practiced with other computer system configurations, including hand held devices, multiprocessor systems, microprocessor based or programmable consumer electronic devices, network personal computers, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 6, an exemplary system for implementing the invention includes a general purpose computing device in the form of a conventional personal computer 220, provided with a processing unit 221, a system memory 222, and a system bus 223. The system bus couples various system components, including the system memory, to processing unit 221 and may be any of several types of bus structures, including a memory bus or memory controller, a peripheral bus, and a local bus using any of a variety of bus architectures. The system memory includes read only memory (ROM) 224 and random access memory (RAM) 225. A basic input/output system (BIOS) 226, containing the basic routines that helps to transfer information between elements within the personal computer 220, such as during start up, is stored in ROM 224. Personal computer 220 further includes a hard disk drive 227 for reading from and writing to a hard disk, not shown, a magnetic disk drive 228 for reading from or writing to a removable magnetic disk 229, and an optical disk drive 230 for reading from or writing to a removable optical disk 231, such as a CDROM or other optical media. Hard disk drive 227, magnetic disk drive 228, and optical disk drive 230 are connected to system bus 223 by a hard disk drive interface 232, a magnetic disk drive interface 233, and an optical drive interface 234, respectively. The drives and their associated computer readable media provide nonvolatile storage of computer readable machine instructions, data structures, program modules, and other data for personal computer 220. Although the exemplary environment described herein employs a hard disk, removable magnetic disk 229, and removable optical disk 231, it will be appreciated by those skilled in the art that other types of computer readable media, which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 229, optical disk 231, ROM 224 or RAM 225, including an operating system 235, one or more application programs 236, other program modules 237, and program data 238. A user may enter commands and information into personal computer 220 through input devices such as a keyboard 240 and a pointing device 242. Other input devices (not shown) may include a microphone, joystick, game pad, satellite dish, scanner, or the like. These and other input devices are often connected to processing unit 221 through an input/output (I/O) interface 246 that is coupled to the system bus. The term I/O interface is intended to encompass each interface specifically used for a serial port, a parallel port, a game port, a keyboard port, and/or a universal serial bus (USB). A monitor 247 or other type of display device is also connected to system bus 223 via an appropriate interface, such as a video adapter 248. In addition to the monitor, personal computers are often coupled to other peripheral output devices (not shown), such as speakers (through a sound card or other audio interface—not shown) and printers.

Personal computer 220 may operate in a networked environment using logical connections to one or more remote computers, such as a remote computer 249. Remote computer 249 may be another personal computer, a server, a router, a network personal computer, a peer device, or other common network node, and typically includes many or all of the elements described above in connection with personal computer 220, although only an external memory storage device 250 has been illustrated in FIG. 21. The logical connections depicted in FIG. 21 include a local area network (LAN) 251 and a wide area network (WAN) 252. Such networking environments are common in offices, enterprise wide computer networks, intranets and the Internet.

When used in a LAN networking environment, personal computer 220 is connected to LAN 251 through a network interface or adapter 253. When used in a WAN networking environment, personal computer 220 typically includes a modem 254, or other means for establishing communications over WAN 252, such as the Internet. Modem 254, which may be internal or external, is connected to the system bus 223, or coupled to the bus via I/O device interface 246, i.e., through a serial port. In a networked environment, program modules depicted relative to personal computer 220, or portions thereof, may be stored in the remote memory storage device. These program modules include machine instructions, which when executed by processing unit 221, cause the functions described above to be implemented in accord with the present invention. It will be appreciated that the network connections shown are exemplary and other means of establishing a communications link between the computers may be used.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for preserving attributes of a persistent object stream in a file that includes at least one object when the file is opened in a different environment than that in which the file was originally created, comprising the steps of:

(a) creating a copy of attributes associated with each object when opening the file in the different environment, said copy including attributes that are unknown to said different environment;

(b) ignoring any of said attributes associated with each object that are unknown to the different environment; and (c) when writing the file, merging known attributes associated with each object that are changed in the different environment, with the copy of the attributes associated with the object, including any attributes that are unknown.

2. The method of claim 1, wherein objects in the file include text entries having whitespace attributes, and wherein a whitespace attribute that is associated with a text entry is preserved in the copy unless changed while the file is open in said different environment.

3. The method of claim 1, wherein objects in the file include tag entries having whitespace attributes, and wherein a whitespace attribute associated with a tag entry is preserved in the copy unless changed while the file is open in said different environment.

4. The method of claim 1, wherein objects in any class that is unknown in the different environment are preserved in the copy and are ignored in the different environment, but are merged with known objects when the file is written.

5. The method of claim 1, wherein the attributes for an object that is unknown to the different environment reference a function associated with the object that is not recognized in the different environment, but is recognized in the environment in which the object was first added to the file.

6. The method of claim 1, further comprising the steps of parsing the file to identify the persistent object stream, and creating a different internal representation of the attributes associated with objects in the file for use in the copy that is created.

7. The method of claim 1, further comprising the steps of determining attributes of the persistent object stream determined when the file was opened and applying said attributes to any related new objects that are added to the file while the file is open, so that attributes of the new objects are consistent with the persistent object stream.

8. The method of claim 1, wherein changes to the file are minimized to insure that the attributes of objects in the file are retained.

9. A computer-readable medium having computer-executable instructions for performing the steps recited in claim 1.

10. A method for preserving attributes of objects in a file when the file is opened in a different environment than that in which the file was originally created, comprising the steps of:
  (a) temporarily storing attributes of the objects included in the file when the file is opened in the different environment, including attributes of the objects in the file that are not recognized in the different environment;
  (b) enabling changes to be made to the file, including adding new objects to the file that have attributes;
  (c) merging the attributes of any new objects added by the changes made to the file with the attributes of the objects that were stored, to produce a revised file; and
  (d) writing the revised file, said revised file including the attributes of the objects included in the file when the file was created and attributes of any new objects added in accord with any changes made to the file, said file preserving the attributes of the objects remaining in the revised file that were originally created in the file.

11. The method of claim 10, wherein the attributes define a stylistic format of the objects in a document, said style of the file originally created being thus preserved following changes to the file in the different environment.

12. The method of claim 11, wherein an object in the file comprises text and an attribute associated with said object defines a whitespace around the object, said object and its associated attribute being stored as a substring to preserve the attribute.

13. The method of claim 12, wherein the whitespace includes at least one of an indent level and a line spacing applied to the text of the object.

14. The method of claim 11, further comprising the step of applying predefined rules to determine the stylistic format that should be associated as a new attribute with a new object added to change the file, said new attribute being merged with the attributes that were stored when writing the revised file.

15. The method of claim 10, further comprising the step of parsing the file to identify the objects and the attributes associated with each object, producing internal representations of the objects and their attributes that are temporarily stored while the file is open in the different environment.

16. The method of claim 10, wherein the objects include a tag element having attributes that defines leading and trailing whitespace for the tag element.

17. The method of claim 16, wherein the trailing whitespace for the tag element determines an indent level for a subsequent object in the file.

18. The method of claim 16, further comprising the step of automatically determining a set of rules to apply in formatting a style for new objects added to the file as a function of the attributes of objects already included in the file opened in the different environment, to be consistent therewith.

19. A computer-readable medium having computer-executable instructions for performing the steps recited in claim 10.

20. A system for preserving attributes of a persistent object stream in a file that includes at least one object when the file is opened in a different environment than that in which the file was originally created, comprising:
  (a) a memory adapted to store data and machine instructions;
  (b) a processor coupled to the memory, said processor controlling storage of data in the memory and executing the machine instructions to implement a plurality of functions;
  (c) a display on which graphics and text are presented to a user in accord with the machine instructions, said display being controlled by the processor; and
  (d) a user input device adapted to enable the user to input data and to control the processor, said plurality of functions implemented by the processor including:
    (i) creating a temporary copy of attributes associated with each object in the memory when reading the file in the different environment, said copy including attributes that are unknown to said different environment;
    (ii) ignoring any of said attributes associated with each object that are unknown to the different environment when the file is opened;
    (iii) enabling the user to enter changes to the file with the user input device after the file has been opened; and
    (iv) merging known attributes associated with each object with the copy of the attributes associated with the object, including any attributes that are unknown, when writing the file to the memory.

21. The system of claim 20, wherein objects in the file include text entries having whitespace attributes, and wherein a whitespace attribute that is associated with a text entry is preserved in the copy unless changed while the file is open in said different environment.

22. The system of claim 20, wherein objects in the file include tag entries having whitespace attributes, and wherein a whitespace attribute associated with a tag entry is preserved in the temporary copy unless changed while the file is open in said different environment.

23. The system of claim 20, wherein objects in any class that is unknown in the different environment are preserved in the temporary copy and are ignored in the different environment, but are merged with known objects when the file is written to the memory.

24. The system of claim 20, wherein the attributes for an object that is unknown in the different environment include a function associated with the object that is not recognized in the different environment, but is recognized in the environment in which the object was first added to the file.

25. The system of claim 20, wherein the machine instructions further cause the processor to parse the file to identify the persistent object stream, and to create a different internal representation of the attributes associated with objects in the file for use in the copy that is created.

26. The system of claim 20, wherein the machine instructions further cause the processor to determine attributes of the persistent object stream when the file was opened and apply said attributes to any related new objects that are added to the file while the file is open, so that attributes of the new objects are consistent with those of the persistent object stream.

27. The system of claim 20, wherein changes to the file written to the memory are minimized to insure that the attributes of objects in the file are retained.

\* \* \* \* \*